United States Patent [19]
Fukuda et al.

[11] Patent Number: 5,822,977
[45] Date of Patent: Oct. 20, 1998

[54] METHOD OF AND APPARATUS FOR PURIFYING EXHAUST GAS UTILIZING A HEATED FILTER WHICH IS HEATED AT A RATE OF NO MORE THAN 10° C./MINUTE

[75] Inventors: Kensei Fukuda, Saga-ken; Shoji Kuroda, Miyazaki-ken; Yoshinobu Kuwamoto, Onojo; Kei Sakanoue, Fukuoka, all of Japan

[73] Assignee: Matsushita Electric Industrial Co., Ltd., Osaka, Japan

[21] Appl. No.: 601,343

[22] Filed: Feb. 16, 1996

[30] Foreign Application Priority Data

Feb. 28, 1995 [JP] Japan .................................. 7-040857

[51] Int. Cl.$^6$ ..................................... F01N 3/00
[52] U.S. Cl. .............................. 60/274; 60/286
[58] Field of Search ....................... 60/274, 286

[56] References Cited

U.S. PATENT DOCUMENTS

| | | | |
|---|---|---|---|
| 5,105,619 | 4/1992 | Arai | 60/286 |
| 5,489,319 | 2/1996 | Tokuda | 60/286 |
| 5,610,844 | 3/1997 | Maus | 60/286 |

FOREIGN PATENT DOCUMENTS

3-36133B2  11/1985  Japan .
4-136409A  5/1992  Japan .

*Primary Examiner*—Thomas E. Denion
*Attorney, Agent, or Firm*—Stevens, Davis, Miller & Mosher, L.L.P.

[57] ABSTRACT

The amount of generation of heat per unit time due to combustion reaction of particulate matter is suppressed, and is made lower than the amount of heat radiation per unit time. By doing so, an abrupt temperature rise called "ignition" is prevented, and a temperature gradient in a filter is made small, thereby preventing unduly-high temperatures from developing. Therefore, the cracking of the filter as well as damage of the filter due to melting can be perfectly prevented, thereby enhancing the reliability. To achieve this, the whole of the filter is heated in such a manner that a temperature rise rate is not more than 10° C./minute when the temperature in the filter is in the range of between 400° C. and 600° C. In the case where the filter carries an oxidizing catalyst, the heating is effected in such a manner that the temperature rise rate is not more than 10° C./minute in the range of between 200° C. and 400° C.

52 Claims, 6 Drawing Sheets

METHOD OF AND APPARATUS FOR PURIFYING EXHAUST GAS UTILIZING A HEATED FILTER WHICH IS HEATED AT A RATE OF NO MORE THAN 10° C./MINUTE

BACKGROUND OF THE INVENTION

This invention relates to a method of and apparatus for purifying exhaust gas, in which particulate matter (combustible particles such as soot) and the like discharged from a diesel engine or the like is collected or arrested, and the arrested particulate matter is burned.

DESCRIPTION OF RELATED ART

Recently, particulate matter (soot), discharged from diesel engines, has begun to be regulated in view of the protection of the environment and health. In one conventional method of removing such particulate matter so as to purify exhaust gas discharged from a diesel engine, a heat-resistant, ceramic filter of a honeycomb construction is provided in an exhaust pipe intermediate opposite ends thereof so as to filter off the particulate matter. A feature of this method is that the particulate matter, when accumulated or deposited to a certain degree, is fired to be burned, so that the particulate matter is converted into carbon dioxide gas, and is discharged to the atmosphere. By doing so, the ceramic filter is regenerated into a clean condition so that the filter can be used repeatedly. This operation is called "combustion regeneration". Generally, the temperature of exhaust gas from a diesel engine is lower than the temperature of ignition of the particulate matter, and therefore if any heating means is not provided, the particulate matter would not be burned, but would be merely deposited on the filter, so that the exhaust pressure would excessively increase, thereby lowering the performance of the engine and an emission performance. Therefore, for effecting the combustion regeneration, it is necessary to raise the temperature of the exhaust gas or the temperature of the filter by some means. Recently, there has been proposed a method in which two filters are provided in an exhaust system so as to alternately effect the purification of exhaust gas. Combustion regeneration is effected not during the filtering of exhaust gas but after particulate matter is deposited to a certain degree while the other filter is effecting the purification of the exhaust gas. The temperature of the filters is raised by an electric heater, a burner, microwaves or the like to burn the particulate matter to regenerate the filters.

A conventional diesel exhaust gas purification apparatus will now be described with reference to the drawings.

Figure 8:
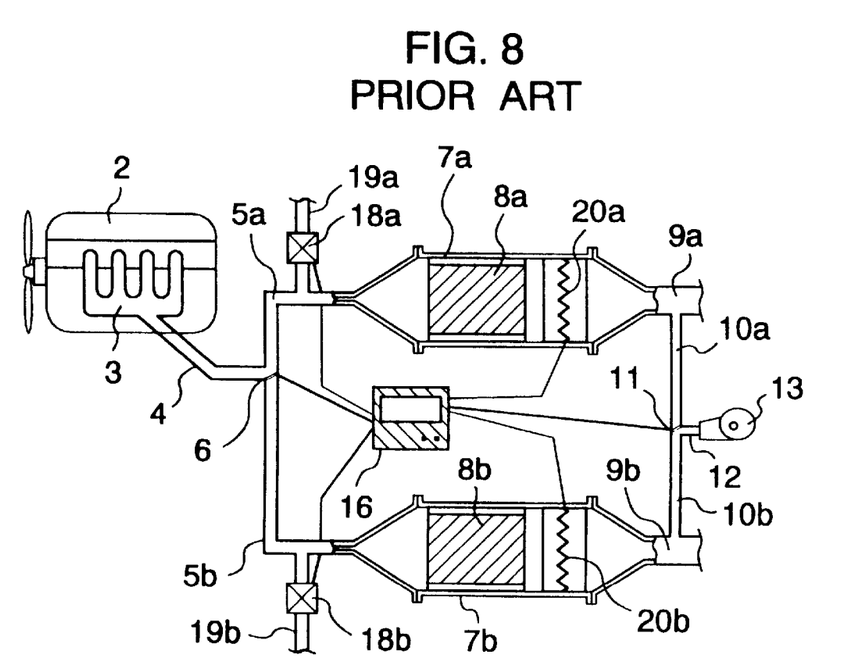
FIG. 8 is a schematic view showing a conventional apparatus for purifying exhaust gas discharged from a diesel engine.

FIG. 8 schematically shows a general construction of the conventional exhaust gas purification apparatus for a diesel engine. Reference numerals 8a and 8b denote ceramic filters of a honeycomb construction, respectively, reference numerals 20a and 20b electric heaters for heating the filters 8a and 8b, respectively, reference numeral 6 a valve for controlling the flow of exhaust gas from the engine, reference numeral 11 an inlet valve for introducing secondary air for combustion regeneration purposes, reference numerals 18a and 18b discharge valves for discharging the secondary air for combustion regeneration purposes, respectively, reference numeral 13 an air blower for supplying the secondary air, reference numerals 4, 5a, 5b, 9a and 9b flow pipes for the engine exhaust gas, respectively, reference numerals 10a, 10b and 12 flow pipes for the secondary air for combustion regeneration purposes, respectively, reference numerals 19a and 19b flow pipes for discharging the secondary air for combustion regeneration purposes, respectively, reference numeral 16 a controller for controlling the air blower 13, the valve 6, the inlet valve 11, the discharge valves 18a and 18b and the electric heaters 20a and 20b, reference numeral 2 the diesel engine, reference numeral 3 a manifold, and reference numerals 7a and 7b containers which contain the filters 8a and 8b, respectively.

The operation of this conventional diesel exhaust gas purification apparatus of the above construction at the time of regeneration will now be described.

During the purification of the exhaust gas by the filter 8a, it is judged by an arresting amount detection device, such as a differential pressure sensor, that the regeneration of the filter 8a should begin. As a result, the valve 6 and the inlet valve 11 are operated or switched, so that exhaust gas, which has so far flowed from the pipe 4 into the pipe 5a, begins to flow from the pipe 4 into the pipe 5b, and flows through the filter 8b to be purified, and further flows out through the pipe 9b. On the other hand, electric power is supplied to the electric heater 20a to heat the filter 8a which has been judged necessary for regeneration. At the same time, the inlet valve 11 is opened, and the secondary air is supplied to the filter 8a through the pipe 10a. Upon lapse of a certain period of time, the temperature of the filter 8a reaches the temperature of ignition of particulate matter, so that the particulate matter begins to be burned. This combustion exhaust gas flows out through the pipe 19a. Then, upon lapse of a certain period of time, the supply of electric power to the electric heater 20a is stopped, and the combustion of the particulate matter only by the secondary air continues. This combustion is achieved by flame propagation of the particulate matter. Then, upon lapse of a certain period of time, it is judged that the combustion regeneration is completed, whereby the air blower 13 is stopped, and the exhaust valve 18a is closed, and the supply of the secondary air is finished, and the filter 8a is ready for the purification operation.

Thereafter, it is judged by the arresting amount detection device such as a differential pressure sensor that the filter 8b is in the time to begin the regeneration thereof. As a result, an operation for the filter 8b similar to the above operation for the filter 8a is carried out, and thus the two filters 8a and 8b alternately effect the exhaust gas purification and the regeneration in a repeated manner.

Although the heating is effected by the electric heaters in the above conventional construction, a heating method (IPC code F01N3/02, 331), employing a burner using gas oil as fuel, has heretofore also been used, and problems to be solved in this case are the stability of the burner and the securing of the safety because of the use of a flame. In a microwave heating method (Japanese Patent Unexamined Publication No. 4-136409), there is an advantage that the amount of arresting of particulate matter can be detected, but there are problems with respect to uniform heating in a filter, leakage of microwaves, the securing of the safety because of the use of high voltage, and so on.

Japanese Patent Examined Publication No. 3-36133 discloses a method in which the temperature of an inlet of a filter is specified. In this method, the temperature necessary for complete combustion of particulate matter is merely specified, and an ignition phenomenon is encountered, and an abrupt temperature rise develops, which leads to the possibility that the filter is damaged.

There is also known a filter regenerating method (called "back-wash method") in which a filter itself is not heated, and instead particulate matter is swept off by high-pressure air, and is heated and burned outside the filter.

In the above conventional construction, however, the combustion is effected by the flame propagation due to the heating by the electric heater, and therefore a temperature gradient in the filter becomes very large, so that cracks develop in the filter. Furthermore, the combustion is continued by the flame propagation, and therefore depending on the condition and amount of arresting of the particulate matter, part of the particulate remains unburned, and when the arresting and the regeneration are repeated, high temperatures develop due to abnormal combustion, and this causes damage due to melting. The development of cracks as well as the damage due to melting adversely affects the performance of the filter, and these have been serious problems to be solved for practical use.

SUMMARY OF THE INVENTION

With the above problems in view, it is an object of this invention to provide exhaust gas purification method and apparatus in which the development of cracks in a filter, as well as damage of the filter due to melting, is suppressed.

DESCRIPTION OF THE PREFERRED EMBODIMENT

According to the present invention, combustion regeneration is not effected by flame propagation, and instead the whole of a filter is heated, using the air as a heating medium, in such a manner that a temperature rise rate is not more than 10° C./minute when the temperature in the filter is in the range of between 400° C. and 600° C. In the case where the filter carries an oxidizing catalyst, the heating is effected in such a manner that the temperature rise rate is not more than 10° C./minute in the range of between 200° C. and 400° C.

The filter for arresting particulate matter has a wall-through type honeycomb construction, and is made of an inorganic material such as cordierite and mullite. The filter usually has a cylindrical shape, but may have a tubular shape with an oval cross-section or with a square cross-section. The filter has a diameter of 4–13 inches and a length of 5–14 inches, and the number (density) of cells of the filter is 50–400 per square inch. The amount of arresting of particulate matter by the filter is expressed by weight (g)/unit volume (1 Liter) of the filter, and the amount is 1–30 g/L.

Examples of air-heating means include an electric heat for heating the air, and a burner for heating the air by burning fuel. The air-heating electric heater is of such a construction that a heating element contacts the air, and examples of the heating element include a nichrome wire, a kanthal wire and a ceramic heater. The capacity of the heater is determined in accordance with the amount of the air to be heated.

A container for containing the filter is made of heat-resistant metal, and a seal member, which contains vermiculite, and can be expanded by heat, is provided between the filter and the container so as to prevent leakage of particulate matter. Because of radiation of heat from the container, a temperature difference develops between the inner and outer peripheries of the filter, and therefore preferably there is used a heat-insulating method in which the container is covered or enveloped by a heat-insulating material such as ceramic wool.

Examples of air-blasting means include an air blower, an air pump and a compressor. The air blower provides a high flow rate, but provides a low static pressure. The air pump and the compressor provide a high static pressure, but provide a low flow rate.

The flow rate of the air is 0.1–2 m3, and the higher the flow rate, the better; however, in view of the ability of the air-blasting means, it is appropriate that this flow rate be not more than 1 m3. A large amount of electric power is needed for heating the air of about 1 m3, and therefore it is preferred to provide electric power-saving means as by circulating the heated air or by using exhaust gas from an engine.

The particulate matter contains soluble organic substance (SOF) as a component, and even when the particulate matter is arrested by the filter, this substance is not burned during regeneration, and evaporates, and is discharged to the atmosphere. Therefore, it is preferred that a SOF oxidizing catalyst, carrying precious metal or the like, be provided before or after the filter used in the present invention.

The following effects are achieved by the technical means of the present invention.

In the present invention, combustion regeneration is not effected by flame propagation, and instead the whole of the filter is heated, using the air as a heating medium, in such a manner that the temperature rise rate is not more than 10° C./minute when the temperature in the filter is in the range of between 400° C. and 600° C. (in the range of 200° C. and 400° C. in the case of the filter carrying the oxidizing catalyst). With this method, the amount of generation of the heat per unit time due to a combustion reaction of the particulate matter is suppressed, and is made lower than the amount of heat radiation per unit time. By doing so, an abrupt temperature rise called "ignition" is prevented, and the temperature gradient in the filter is made small, thereby preventing unduly-high temperatures from developing. Therefore, the cracking of the filter as well as damage of the filter due to melting can be perfectly prevented.

Figure 1:
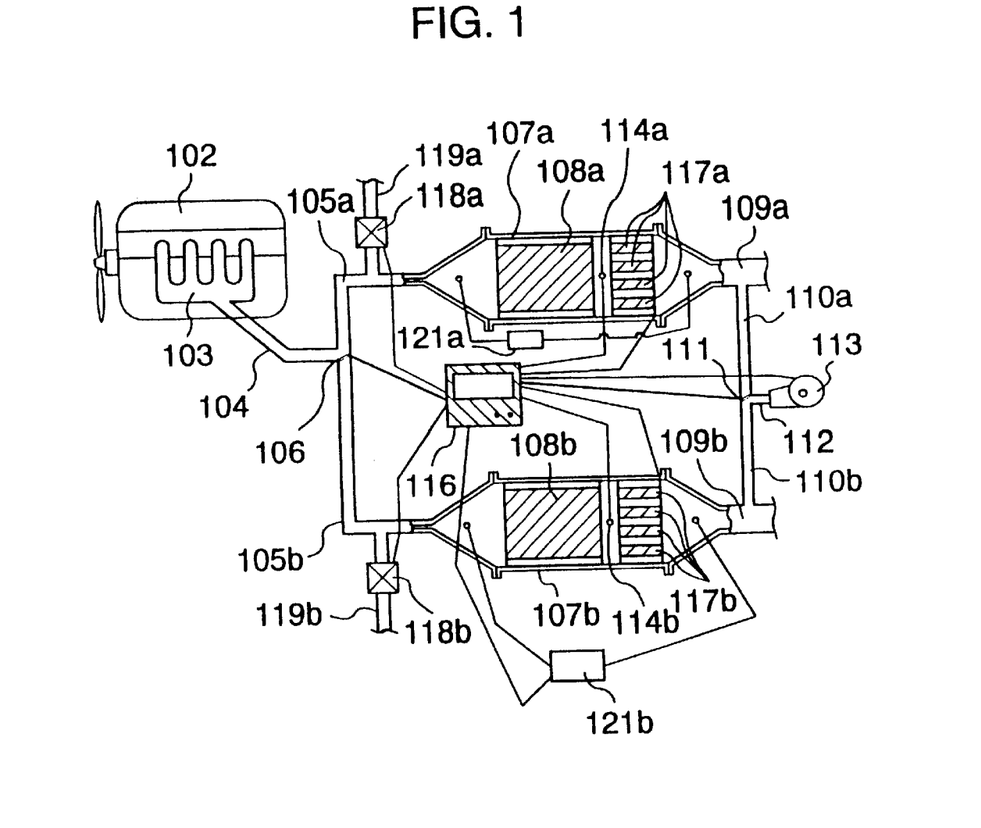
FIG. 1 is a schematic view of an apparatus for purifying exhaust gas according to one preferred embodiment of the present invention.

With reference to the drawings, FIG. 1 is a schematic view of an apparatus for purifying exhaust gas according to one preferred embodiment of the present invention.

In FIG. 1, a manifold 103 is connected to a diesel engine 102, and a pipe 104 is connected to the manifold 103. Branch pipes 105a and 105b are connected to the pipe 104, and a branch valve 106 is provided at a joint portion where the pipe 104 is connected to the branch pipes 105a and 105b. A discharge pipe 119a is connected to the branch pipe 105a through a discharge valve 118a. Similarly, a discharge pipe 119b is connected to the branch pipe 105b through a discharge valve 118b.

A filter container 107a is connected to the branch pipe 105a, and the filter container 107a contains or houses a filter 108a for arresting particulate matter and the like in exhaust gas to purify the exhaust gas, an electric heater 117a, and a temperature sensor 114a disposed between the filter 108a and the electric heater 117a. The filter 108a and the electric heater 117a are arranged in this order within the filter container 107a in a direction of flow of the exhaust gas.

A differential pressure sensor 121a measures or detects a pressure differential between opposite ends of the filter 108a within the filter container 107a.

A filter container 107b is connected to the branch pipe 105b, and has substantially the same construction as that of the filter container 107a. More specifically, the filter container 107b contains or houses a filter 108b for arresting particulate matter and the like in exhaust gas to purify the exhaust gas, an electric heater 117b, and a temperature sensor 114b disposed between the filter 108b and the electric heater 117b. The filter 108b and the electric heater 117b are arranged in this order within the filter container 107b in a direction of flow of the exhaust gas.

A differential pressure sensor 121b measures or detects a pressure differential between opposite ends of the filter 108b within the filter container 107b.

A pipe 109a is connected to the filter container 107a, and discharges the purified exhaust gas, and a pipe 109b is connected to the filter container 107b, and discharges the purified exhaust gas. An air blower 113 produces a stream of air, and a pipe 112 is connected to the air blower 113. Branch pipes 110a and 110b are connected to the pipe 112, and are also connected to the pipes 109a and 109b, respectively. A branch valve 111 is provided at a joint portion where the pipe 112 is connected to the branch pipes 110a and 110b.

A controller (control portion) 116 controls the electric heaters 117a and 117b, the air blower 113 and so on.

Preferably, the above pipes are made of a corrosion-resistant material such as stainless steel. The above valves (including the discharge valves and the branch valves) may be driven by any suitable means such as a pneumatic means, a hydraulic means and a solenoid means. Preferably, those portions of each of the above valves for contact with the exhaust gas are made of a corrosion-resistant material such as stainless steel.

Preferably, the filters 108a and 108b are made of a corrosion-resistant material such as cordierite and mullite, and have a honeycomb construction with a small pressure loss. An oxidizing catalyst may be provided on at least one of the filters 108a and 108b.

The air blower 113 is required to provide a predetermined output flow rate and a predetermined static pressure, depending on the size of the filters 108a and 108b, and it is preferred that the air blower 113 should provide a large flow rate and a large static pressure. Instead of the air blower 113, an air pump may be used.

The temperature sensors 114a and 114b may be of any suitable type capable of detecting relatively high temperatures, such as a sheathed thermo couple and a platinum resistor. Since these sensors 114a and 114b are exposed to exhaust gas, it is preferred that they may be corrosive-resistant. Preferably, each of these sensors is so arranged as to prevent the lowering of the indicated temperature due to heat transfer by radiation.

Preferably, each of the electric heaters 117a and 117b is of the type in which a heating element, such as a nichrome wire or a kanthal wire, is wound in a manner to enhance the thermal efficiency, and is contained within a support member of a ceramics material.

Preferably, semiconductor pressure sensors or the like are used at those portions of the differential pressure sensors 121a and 121b provided on the respective filter containers 107a and 107b, and preferably a mist filter or the like is provided around each sensor so that exhaust gas will not be brought into direct contact with the sensor.

Figure 2:
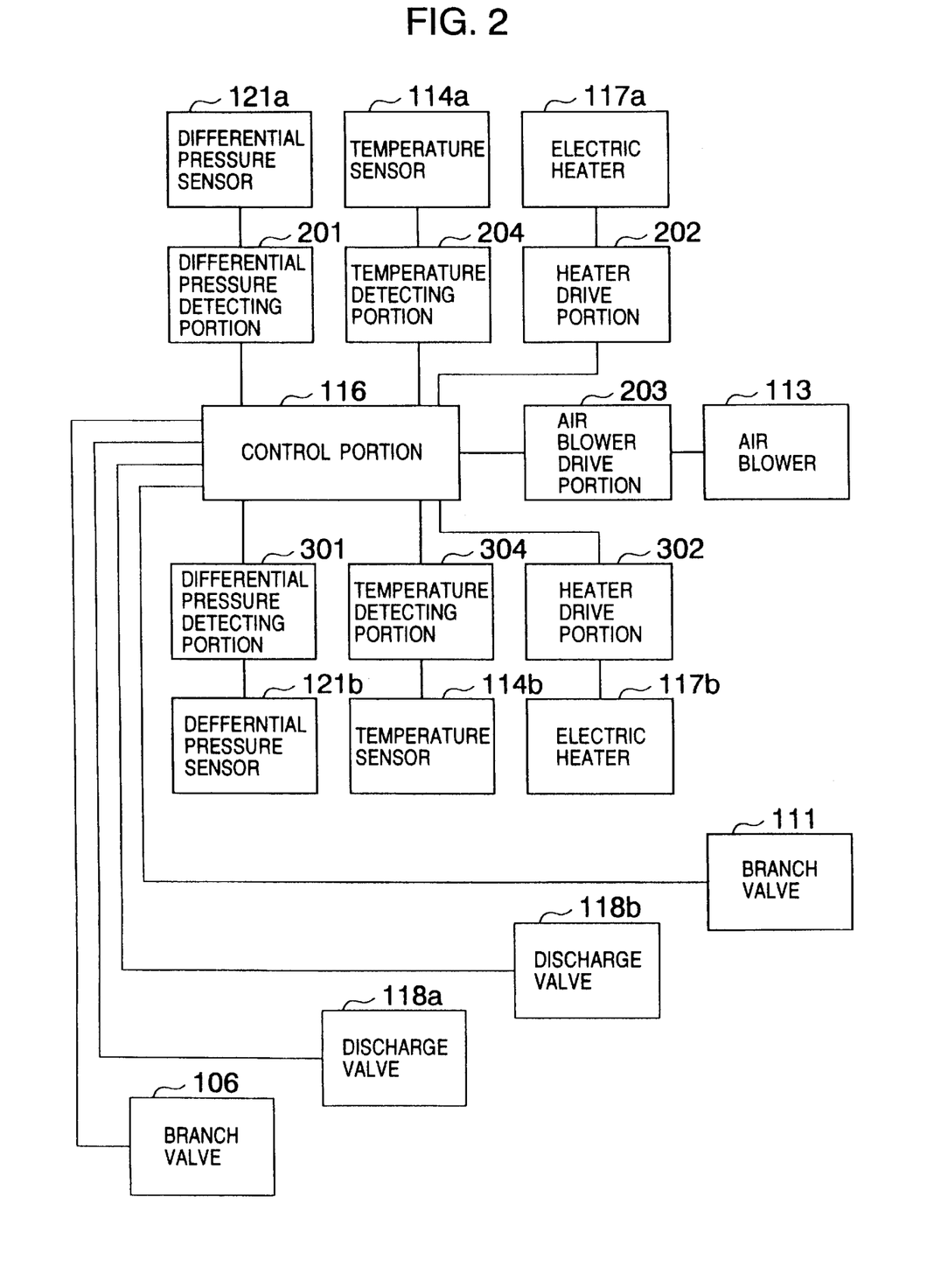
FIG. 2 is a block diagram of a system of the exhaust gas purification apparatus of FIG. 1.
Figure 3:
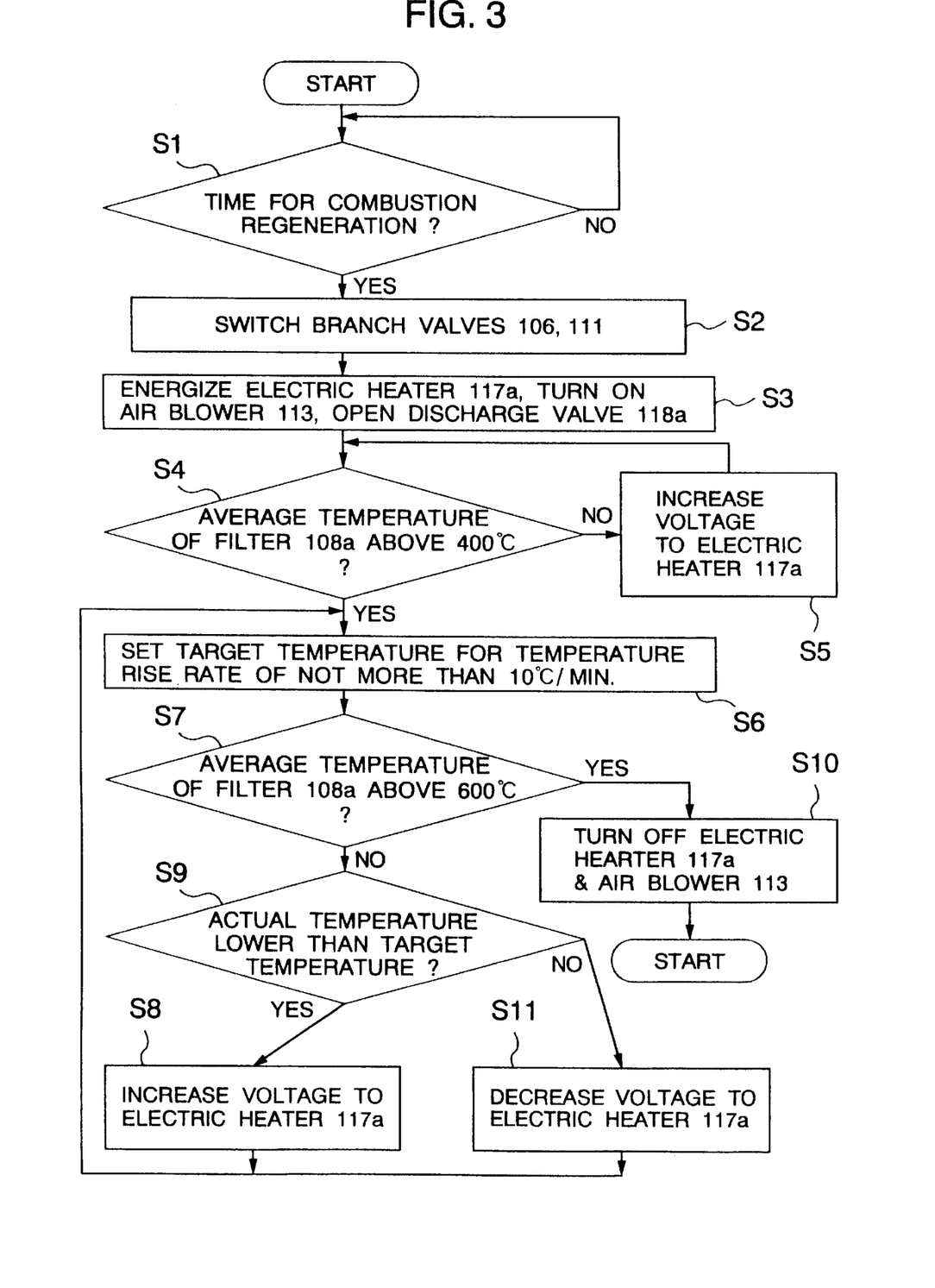
FIG. 3 is a flow chart showing the operation of the exhaust gas purification apparatus of the invention.

The operation of the exhaust gas purification apparatus of the above construction will now be described with reference to FIGS. 1, 2 and 3. FIGS. 2 is a block diagram of the exhaust gas purification apparatus of the invention, and FIG. 3 is a flow chart showing the operation of the apparatus. In this embodiment, explanation will be made of the operation in which after exhaust gas is first purified by the filter container 107a, exhaust gas is caused to flow into the filter container 107b, and further the filter 108a within the filter container 107a is regenerated.

First, in Step 1 (indicated as S1 in FIG. 3), the controller 116 judges whether or not it is time for combustion regeneration. In Step 1, the controller 116 checks the output of the differential pressure sensor 121a so as to judge whether or not it is time for combustion regeneration. More specifically, a differential pressure detection portion 201 produces a differential pressure signal in accordance with the output of the differential pressure sensor 121a, and the controller 116 judges from this differential pressure detection signal whether or not it is time for combustion regeneration. In this embodiment, the larger the difference between the exhaust gas inlet side of the filter container 107a and the exhaust gas outlet side thereof, the larger the amount of arresting of particulate matter and the like, and therefore the controller 116 can judge the timing for combustion regeneration.

Then, in Step 2, the controller 116 causes the branch valve 106 to be operated or switched so that exhaust gas in the manifold 103, which has so far flowed into the filter container 107a, can flow into the filter container 107b, thereby communicating the branch pipe 105b with the pipe 104. As a result, the exhaust gas from the manifold 103 flows into the filter container 107b. Further, the controller 116 causes the branch valve 111 to be operated or switched so that a blast of the air, produced by the air blower 113, can be fed into the filter container 107a via the branch pipe 110a and the pipe 109a.

Then, in Step 3, the controller 116 feeds a signal to a heater drive portion 202 to heat the electric heater 117a. In Step 3, the controller 116 also feeds a signal to an air blower drive portion 203 to drive the air blower 113, thereby starting the air blowing. In Step 3, the controller 116 also feeds a signal to the discharge valve 118a to communicate the branch pipe 105a with the pipe 119a. With these processings, the blast of air produced by the air blower 113 is fed to the filter container 107a via the branch pipe 110a and the pipe 109a, and is heated into a hot air stream by the electric heater 117a within the filter container 107a. This hot air stream flows into the filter 108a to heat the same, and burns the particulate matter and the like arrested or collected in the filter 108a. The hot air stream thus flowed into the filter 108a is discharged from the filter container 107a, and flows into the pipe 119a via the branch pipe 105a and the discharge valve 118a, and is discharged to the exterior.

Figure 4A:
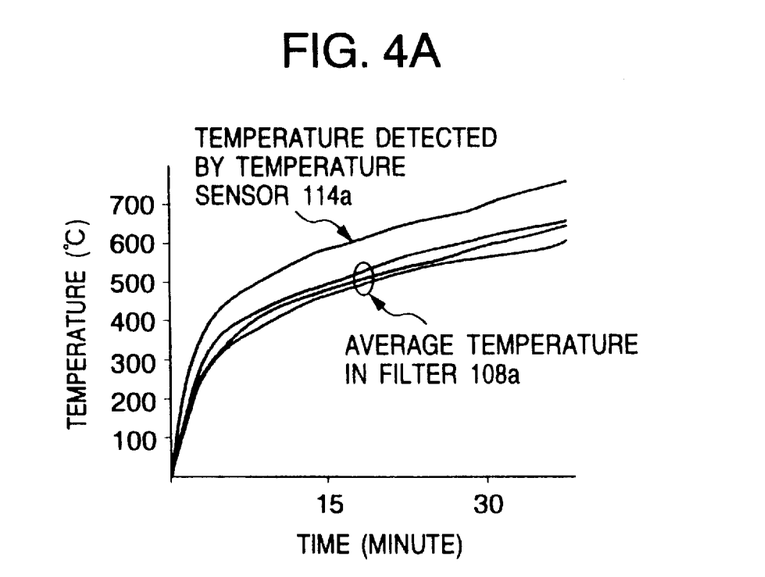
FIGS. 4A and 4B are diagrams showing the relation between the temperature, detected by a temperature sensor, and the average temperature in a filter.
Figure 4B:
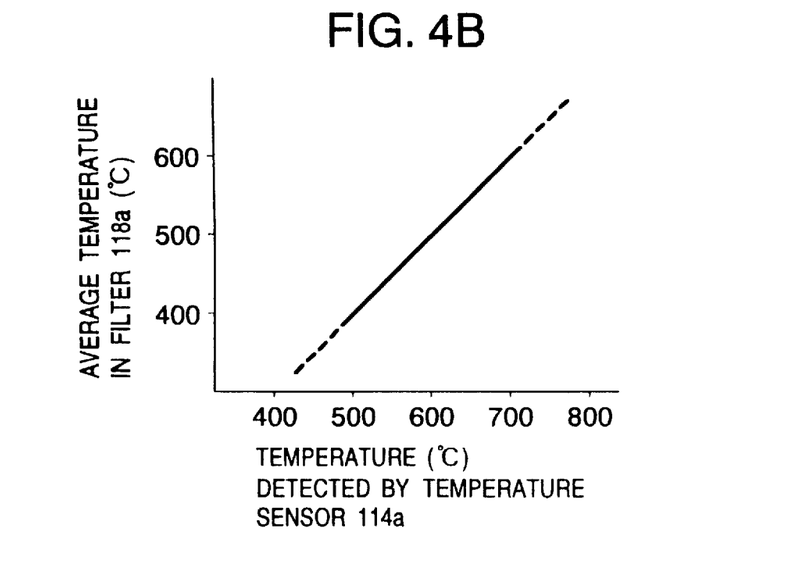
Figure 5:
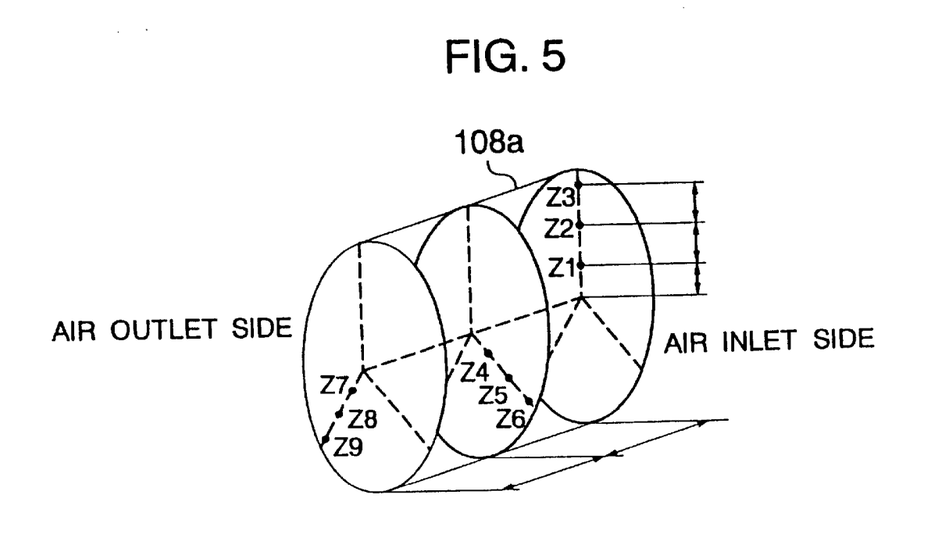
FIG. 5 is a view showing measuring points used for determining the average temperature in the filter.
Figure 6A:
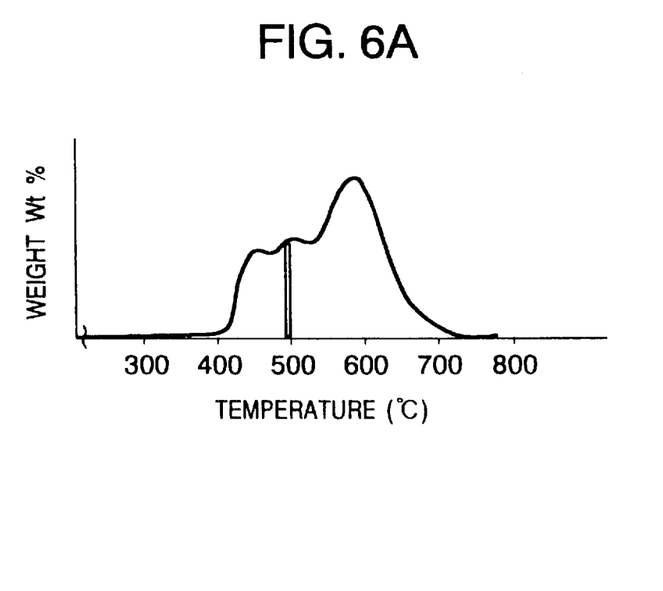
FIGS. 6A and 6B are characteristics diagrams showing the relation between the temperature and combustion weight of arrested particulate matter determined by thermal analysis.
Figure 6B:
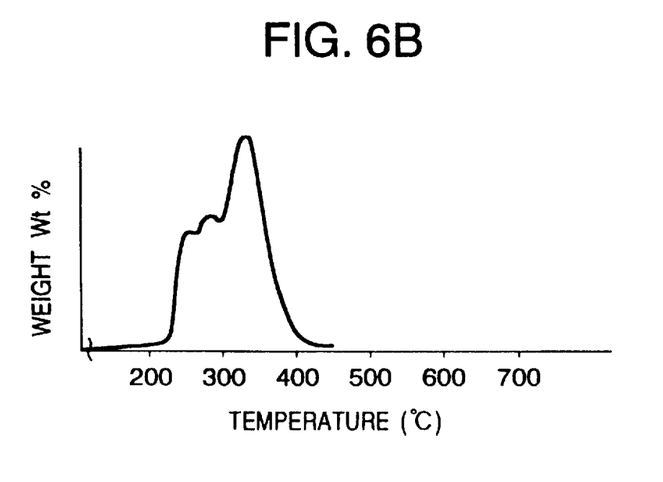

In Step 4, a temperature detection portion 204 produces a temperature signal in accordance with the output of the temperature sensor 114a, and the controller 116 judges from this temperature signal whether or not the average temperature in the filter 108a is not less than 400° C. At this time, upon lapse of time, the difference between the temperature detected by the temperature sensor 114a and the average temperature in the filter 108a becomes about 100° C., as shown in FIG. 4A. More specifically, when the temperature sensor 114a indicates about 500° C., the average temperature in the filter 108a is about 400° C. Furthermore, there is the correlation between the temperature detected by the temperature sensor 114a and the average temperature in the filter 108a as shown in FIG. 4B, and when the temperature detected by the temperature sensor 114a is, for example, 600° C., the average temperature in the filter 108a is 500° C., as will be appreciated from FIG. 4B. In this embodiment, the difference between the temperature detected by the temperature sensor 114a and the average temperature in the filter 108a is about 100° C. as shown in FIG. 4A, and further the detection temperature and the average temperature is linearly correlated with each other as shown in FIG. 4B. However, these temperatures vary depending on the kind of the filter 108a, the regeneration temperature, the kind of exhaust gas and so on, and therefore the relation between the two temperatures must be found in view of these factors. In this embodiment, the average temperature in the filter 108a (which is a cylindrical filter having a diameter of 5.66 inches and a length of 6 inches) is determined by averaging the sum of temperatures measured respectively at temperature-measuring points Z1 to Z9, as shown in FIG. 5. The point Z1 is spaced about 20 mm from the axis or centerline of the cylinder, and the points Z4 to Z6 indicate temperatures in the vicinity of the center of the filter 108a.

If it is judged in Step 4 that the average temperature in the filter 108a is below 400° C., the processing proceeds to Step 5 in which the controller 116 feeds a signal to the heater drive portion 202 to increase the voltage applied to the electric heater 117a. In contrast, if it is judged in Step 4 that the average temperature in the filter 108a is not less than 400° C., the processing proceeds to Step 6. The reason why this average temperature in the filter 108a is set to not less than 400° C. is that most of the components of the matters (mainly particulate matter) arrested by the filter begin to be burned at temperatures above 400° C.

In the case where the oxidizing catalyst is provided on the filter 108a, it is judged in Step 4 whether or not the temperature in the filter 108a is not less than 200° C. The reason for 200° C. is that most of the arrested matters are burned at temperatures above 200° C. as a result of the provision of the oxidizing catalyst.

In Step 6, a target temperature after a predetermined period of time is so set that the rate of rise of the average temperature in the filter 108a (hereinafter referred to as "average temperature rise rate") is not more than 10° C./minute. For example, if the average temperature in the filter 108a is 400° C. at present, the target temperature after 0.5 minute is set to 405° C. (in this case, the average temperature rise rate is 10° C./minute). Although the average temperature rise rate is not more than 10° C./minute, this rate is preferably 3° C./minute to 7° C./minute, and more preferably 4° C./minute to 5° C./minute.

In Step 7, it is judged whether or not the average temperature in the filter 108a is above 600° C., and if this average temperature is above 600° C., the processing jumps to Step 10 in which the electric heater 117a and the air blower 113 are turned off. In contrast, if it is judged in Step 7 that the average temperature is not more than 600° C., the processing proceeds to Step 9.

In Step 9, it is judged whether or not the actual temperature is lower than the target temperature, and if the actual temperature is lower than the target temperature, the processing proceeds to Step 8 in which the voltage applied to the electric heater 117a is increased. Then, the processing returns to Step 6 in which a fresh target temperature is set. If it is judged in Step 9 that the actual temperature is higher than the target temperature, the processing proceeds to Step 11 in which the voltage applied to the electric heater 117a is decreased. Then, the processing proceeds to Step 6 in which a fresh target temperature is set.

The regeneration of the filter container 107b is effected in the same manner as described above for the filter container 107a. In this case, a differential pressure detecting portion 301, a heater drive portion 302 and a temperature detecting portion 304 respectively perform the same functions as the differential pressure detection portion 201, the heater drive portion 202 and the temperature detecting portion 204 perform.

In this embodiment, although the temperature within the filter container 107a is adjusted by changing the amount of heat produced by the electric heater 117a, this temperature may be adjusted by varying the amount of the air stream produced by the air blower 113. Alternatively, this temperature may be adjusted by changing both the amount of heat, produced by the electric heater 117a, and the amount of the air stream produced by the air blower 113. However, it is most preferred to control the electric heater 117a as in this embodiment, since this method can be effected by a simple control and at a low cost.

As described above, this embodiment is directed to the apparatus in which the exhaust gas is purified by one of the filter containers 107a and 107, and when the one filter container is clogged by the exhaust gas, the exhaust gas is purified by the other filter container, and the filter within the one filter container is regenerated. However, similar effects can be achieved in an apparatus having only one filter container. In such an apparatus having the single filter container, when the filter is clogged, the engine is once stopped, and then the filter is regenerated. Similar effects can also be achieved in an apparatus having three or more filter containers.

In this embodiment, although it is judged whether or not the average temperature in the filter 108a is 600° C., there may be used an arrangement in which such a time period is pre-set that the average temperature will not exceed 600° C., and before this time period lapses, the filter is heated at a predetermined temperature rise rate.

In this embodiment, although the average temperature is set to not more than 600° C. in view of the material of the filter 108a and other factors, it may slightly exceed 600° C. However, it is most preferred that the average temperature should be not more than 600° C. as in this embodiment.

In this embodiment, although the filter 108a is heated by the hot air stream, similar effects can be achieved by heating the filter 108a with a hot (or heated) fluid having the exhaust gas or an oxidizing agent added thereto. Among such hot fluids, the hot or heated air can be easily used, and this makes the construction simple, and reduces the cost.

Next, the average temperature rise rate will now be described.

In a test, there was used a filter which was made of mullite, and had a cylindrical shape having a diameter of 5.66 inches and a length of 6 inches. The number of cells of the filter was 100 cells per square inch, and the amount of arresting of particulate matter by the filter was 15 g/liter. An electric heater was used as air-heating means, and comprised a heating element mounted within a metal pipe through which the air was passed. A kanthal wire was used as the heating element. An air blower was used as air-blasting means, and the flow rate of the air was 600 liters/minute. The other construction was the same as shown in FIG. 1.

Figure 7:
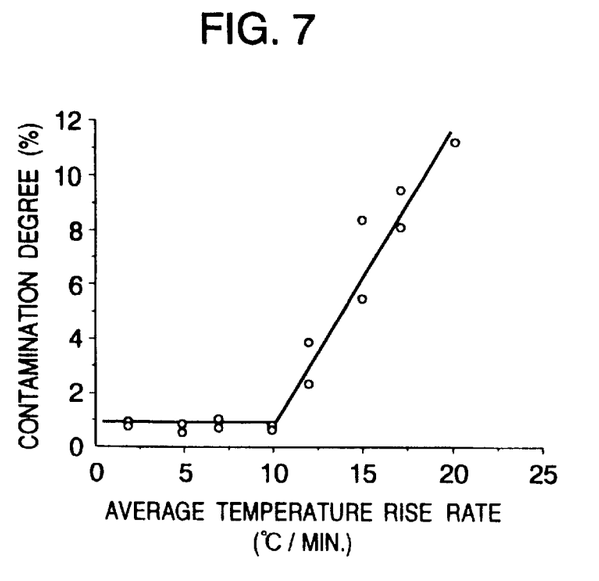
FIG. 7 is a characteristics diagram showing the relation between the rate of rise of the average temperature and the degree of contamination.

FIG. 7 shows the relation between the average temperature rise rate and the degree of contamination representing the amount of leakage of the particulate matter after regeneration. The average temperature rise rate is determined by inputting the temperature data every 5 seconds and by calculating the temperature rise rate per minute. The contamination degree was measured using JIS D8004 (reflecting smoke meter for measuring exhaust smoke from an automobile diesel engine). As is clear from FIG. 7, when the average temperature rise rate is not more than 10° C./minute, the contamination degree does not increase, and the filter is not damaged. When the average temperature rise rate is more than 10° C./minute, the contamination degree increases, and the filter is damaged. The lower the average temperature rise rate, the better; however, it takes a considerable time for the average temperature to rise to 600° C., and therefore the average temperature rise rate is preferably not less than 3° C./minute. If the average temperature rise rate is set to 10° C./minute, it often increases to 11° C./minute because of a control error, and therefore the average temperature rise rate is preferably not more than 7° C./minute. Therefore, this rate is preferably 3° C./minute to 7° C./minute, and its more practical range is 4° C./minute to 5° C./minute.

As described above, in this embodiment, the filter 108a is subjected to combustion regeneration in such a manner that the average temperature rise rate is not more than 10° C./minute (preferably 3° C./minute to 7° C./minute, and more preferably 4° C./minute to 520 C./minute) when the temperature in the filter is in the range of between 400° C. and 600° C. (in the range of 200° C. and 400° C. in the case of the filter 108a carrying the oxidizing catalyst). By doing so, the filter 108a will not be damaged.

In the present invention, combustion regeneration is not effected by flame propagation, and instead the whole of the filter is heated, using the air as a heating medium, so that the temperature rise rate is not more than 10° C./minute when the temperature in the filter is in the range of between 400° C. and 600° C. (in the range of 200° C. and 400° C. in the case of the filter carrying the oxidizing catalyst). With this method, the amount of generation of the heat per unit time due to the combustion reaction of the particulate matter is suppressed, and is made lower than the amount of heat radiation per unit time. By doing so, an abrupt temperature rise called "ignition" is prevented, and the temperature gradient in the filter is made small, thereby preventing unduly-high temperatures from developing. Therefore, the cracking of the filter as well as damage of the filter due to melting can be perfectly prevented.

What is claimed is:

1. A method of purifying exhaust gas, the method comprising:
   (a) passing the exhaust gas through a filter to remove at least particulate matter from the exhaust gas;
   (b) heating said filter to burn the particulate matter deposited on said filter such that an amount of generation of heat per unit time due to a combustion reaction of the particulate matter is less than an amount of heat radiation from the filter per unit time; and
   (c) setting a rate of rise of an average temperature in said filter not more than 10° C./minute when the average temperature is in a range of temperatures which are not less than 400° C.

2. A method according to claim 1, wherein said filter is heated in such a manner that the average temperature in said filter is not more than 600° C.

3. A method according to claim 1, wherein the rate of rise of the average temperature in said filter is 3° C./minute to 7° C./minute.

4. A method according to claim 1, wherein the rate of rise of the average temperature in said filter is 4° C./minute to 5° C./minute.

5. A method according to claim 1 to 4, wherein said filter is heated by a fluid.

6. A method according to claim 2, wherein the rate of rise of the average temperature in said filter is 3° C./minute to 7° C./minute.

7. A method according to claim 2, wherein the rate of rise of the average temperature in said filter is 4° C./minute to 5° C./minute.

8. A method according to claim 2, wherein said filter is heated by a fluid.

9. A method according to claim 3, wherein said filter is heated by a fluid.

10. A method according to claim 4, wherein said filter is heated by a fluid.

11. A method according to claim 6, wherein said filter is heated by a fluid.

12. A method according to claim 7, wherein said filter is heated by a fluid.

13. A method according to claim 1, wherein step (b) comprises heating the filter with heated air.

14. A method of purifying exhaust gas, the method comprising the steps of:
    passing exhaust gas through a filter carrying an oxidizing catalyst, thereby removing particulate matter and the like from the exhaust gas;
    heating said filter to burn the particulate matter and the like deposited on said filter; and
    setting a rate of rise of an average temperature in said filter not more than 10° C./minute in a range of the average temperature in said filter reaching not less than 200° C. when said filter is heated.

15. A method according to claim 14, wherein said filter is heated in such a manner that the average temperature in said filter is not more than 400° C.

16. A method according to claim 14, wherein the rate of rise of the average temperature in said filter is 3° C./minute to 7° C./minute.

17. A method according to claim 14, wherein the rate of rise of the average temperature in said filter is 4° C./minute to 5° C./minute.

18. A method according to claim 14, wherein said filter is heated by a fluid.

19. A method according to claim 7, wherein the rate of rise of the average temperature in said filter is 3° C./minute to 7° C./minute.

20. A method according to claim 7, wherein the rate of rise of the average temperature in said filter is 4° C./minute to 5° C./minute.

21. A method according to claim 7, wherein said filter is heated by a fluid.

22. A method according to claim 8, wherein said filter is heated by a fluid.

23. A method according to claim 9, wherein said filter is heated by a fluid.

24. A method according to claim 19, wherein said filter is heated by a fluid.

25. A method according to claim 20, wherein said filter is heated by a fluid.

26. A method according to claim 14, wherein step (b) comprises heating the filter with heated air.

27. An apparatus for purifying exhaust gas, the apparatus comprising:
   a filter for passing the exhaust gas through said filter so as to arrest at least particulate matter in the exhaust gas;
   a filter container containing said filter;
   a first pipe for supplying the exhaust gas to said filter container;
   a second pipe for discharging the exhaust gas from said filter container after the exhaust gas has been purified;
   temperature detecting means for detecting a temperature of said filter to output temperature information;
   heating means for heating said filter; and
   a control portion for controlling energy to be supplied to said heating means based on the temperature information from said temperature detecting means so as to heat said filter in such a manner that a rate of rise of an average temperature in said filter is not more than 10° C./minute when the average temperature in said filter is in a range of between 400° C. and 600° C.

28. An apparatus according to claim 27, wherein said heating means comprises an air-blasting means, and an electric heater for heating a blast of air from said air-blasting means, said filter being heated by said hot blast of air.

29. An apparatus according to claim 27, 28, wherein said control portion controls said energy in such a manner that the rate of rise of the average temperature in said filter is 3° C./minute to 7° C./minute.

30. An apparatus according to claim 27, 28, wherein said control portion controls said energy in such a manner that the rate of rise of the average temperature in said filter is 4° C./minute to 5° C./minute.

31. An apparatus according to claim 28, wherein said control portion controls a voltage to be applied to said electric heater.

32. An apparatus according to claim 28, wherein said control portion controls said energy in such a manner that the rate of rise of the average temperature in said filter is 3° C./minute to 7° C./minute.

33. An apparatus according to claim 28, wherein said control portion controls said energy in such a manner that the rate of rise of the average temperature in said filter is 4° C./minute to 5° C./minute.

34. An apparatus according to claim 29, wherein said control portion controls a voltage to be applied to said electric heater.

35. An apparatus according to claim 30, wherein said control portion controls a voltage to be applied to said electric heater.

36. An apparatus according to claim 32, wherein said control portion controls a voltage to be applied to said electric heater.

37. An apparatus according to claim 33, wherein said control portion controls a voltage to be applied to said electric heater.

38. An apparatus according to claim 27, wherein the control portion comprises means for controlling the heating means to heat the filter such that an amount of generation of heat per unit time due to a combustion reaction of the particulate matter is less than an amount of heat radiation from the filter per unit time.

39. An apparatus according to claim 38, wherein the heating means comprises means for heating the filter with heated air.

40. An apparatus for purifying exhaust gas, the apparatus comprising:
   a filter for passing exhaust gas through said filter so as to arrest at least particulate matter in the exhaust gas, said filter carrying an oxidizing agent;
   a filter container for containing said filter;
   a first pipe for supplying the exhaust gas to said filter container;
   a second pipe for discharging the exhaust gas from said filter container after the exhaust gas has been purified;
   temperature detecting means for detecting the temperature of said filter to output temperature information;
   heating means for heating said filter; and
   a control portion for controlling energy to be supplied to said heating means based on the temperature information from said temperature detecting means so as to heat said filter in such a manner that a rate of rise of an average temperature in said filter is not more than 10° C./minute when the average temperature in said filter is in a range of between 200° C. and 400° C.

41. An apparatus according to claim 40, wherein said heating means comprises an air-blasting means, and an electric heater for heating a blast of air from said air-blasting means, said filter being heated by said hot blast of air.

42. An apparatus according to claim 40, 41, wherein said control portion controls said energy in such a manner that the rate of rise of the average temperature in said filter is 3° C./minute to 7° C./minute.

43. An apparatus according to claim 40, 41, wherein said control portion controls said energy in such a manner that the rate of rise of the average temperature in said filter is 4° C./minute to 5° C./minute.

44. An apparatus according to claim 41, wherein said control portion controls a voltage to be applied to said electric heater.

45. An apparatus according to claim 41, wherein said control portion controls said energy in such a manner that the rate of rise of the average temperature in said filter is 3° C./minute to 7° C./minute.

46. An apparatus according to claim 41, wherein said control portion controls said energy in such a manner that the rate of rise of the average temperature in said filter is 4° C./minute to 5° C./minute.

47. An apparatus according to claim 42, wherein said control portion controls a voltage to be applied to said electric heater.

48. An apparatus according to claim 43, wherein said control portion controls a voltage to be applied to said electric heater.

49. An apparatus according to claim 45, wherein said control portion controls a voltage to be applied to said electric heater.

50. An apparatus according to claim 46, wherein said control portion controls a voltage to be applied to said electric heater.

51. An apparatus according to claim 40, wherein the control portion comprises means for controlling the heating means to heat the filter such that an amount of generation of heat per unit time due to a combustion reaction of the particulate matter is less than an amount of heat radiation from the filter per unit time.

52. An apparatus according to claim 51, wherein the heating means comprises means for heating the filter with heated air.

* * * * *